Figure 1:
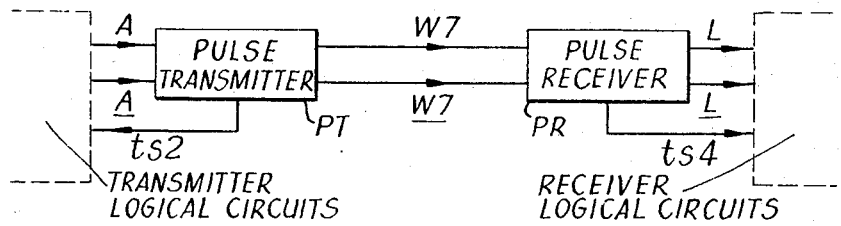

Oct. 25, 1966

A. P. CLARK 3,281,694

CARRIER CURRENT SIGNALLING SYSTEM USING QUATERNARY MODULATION

Filed Dec. 24, 1962

7 Sheets-Sheet 1

INVENTOR
ADRIAN PERCY CLARK
BY
DEZSOE STEINHERZ
ATTORNEY

INVENTOR
ADRIAN PERCY CLARK
BY
DEZSOE STEINHERZ
ATTORNEY

United States Patent Office 3,281,694
Patented Oct. 25, 1966

3,281,694
CARRIER CURRENT SIGNALLING SYSTEM
USING QUATERNARY MODULATION
Adrian Percy Clark, Taplow, England, assignor to British Telecommunications Research Limited, Taplow, England, a British company
Filed Dec. 24, 1962, Ser. No. 246,807
Claims priority, application Great Britain, Jan. 2, 1962, 173/62
12 Claims. (Cl. 325—30)

The present invention relates to electrical signalling systems and is more particularly concerned with the transmission of data which may be in binary form. The invention moreover is concerned with systems making use of phase modulation, that is to say a particular value of a unit of information is determined by the phase change which occurs between successive elements. This includes the case in which the phase change is zero, that is to say there is no change.

Where the information is in binary form as suggested, the most imple form of this arrangement is to employ two possible phase changes, namely 0° and 180° corresponding to the two possible binary values. In some circumstances however it may be advantageous to operate on a quaternar basis in which there are four possible values of the phase change and hence more information can be transmitted per element. This offers advantages in simplifying the extraction of the signal element rate at the receiving end and it enables exact synchronism to be maintained without any appreciable limitations on the nature of the signals to be sent. The chief object of the invention is to provide an improved quaternary phase-modulated data transmission system which provides operating advantages without any serious increase in the complication of the control circuits.

According to the invention, in an electrical signalling system employing phase modulation of a carrier current, the information to be transmitted is in the form of a series of binary elements which are combined in successive pairs and transmitted in combined form by quarternary phase modulation.

According to one feature of the invention, a modulator for producing quaternary modulation of a carrier current is arranged so that two supplies of carrier current differing in phase by 90° are connected to a common point by way of diodes which are biased by a first control potential so that the two supplies are effective alternatively, each lead from the common point being connected to both leads of the output in each case by way of further diodes the further diodes being selectively biased by a second control potential whereby quaternary modulation of the carrier supply is effected jointly by the first and second control potentials.

According to another feature of the invention, in an integrating circuit for obtaining the average value of a waveform over a predetermined period, a capacitor is arranged to be charged from the incoming waveform by way of a diode bridge, the capacitor also being subject to the action of a timing waveform by way of further diodes whereby the capacitor is given a potential at the beginning of the predetermined period midway between the limits of the negative and positive excursions of the waveform to be integrated.

Figure 6:
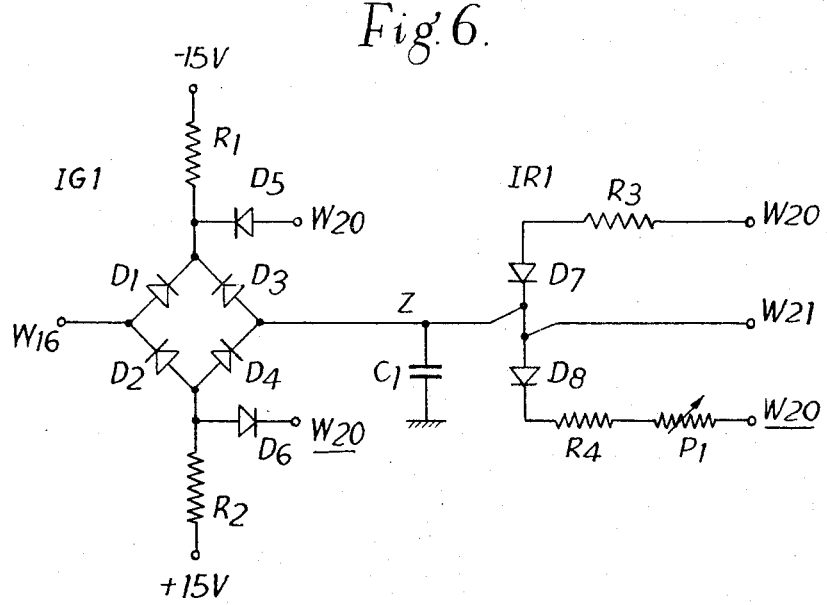
Figure 2:
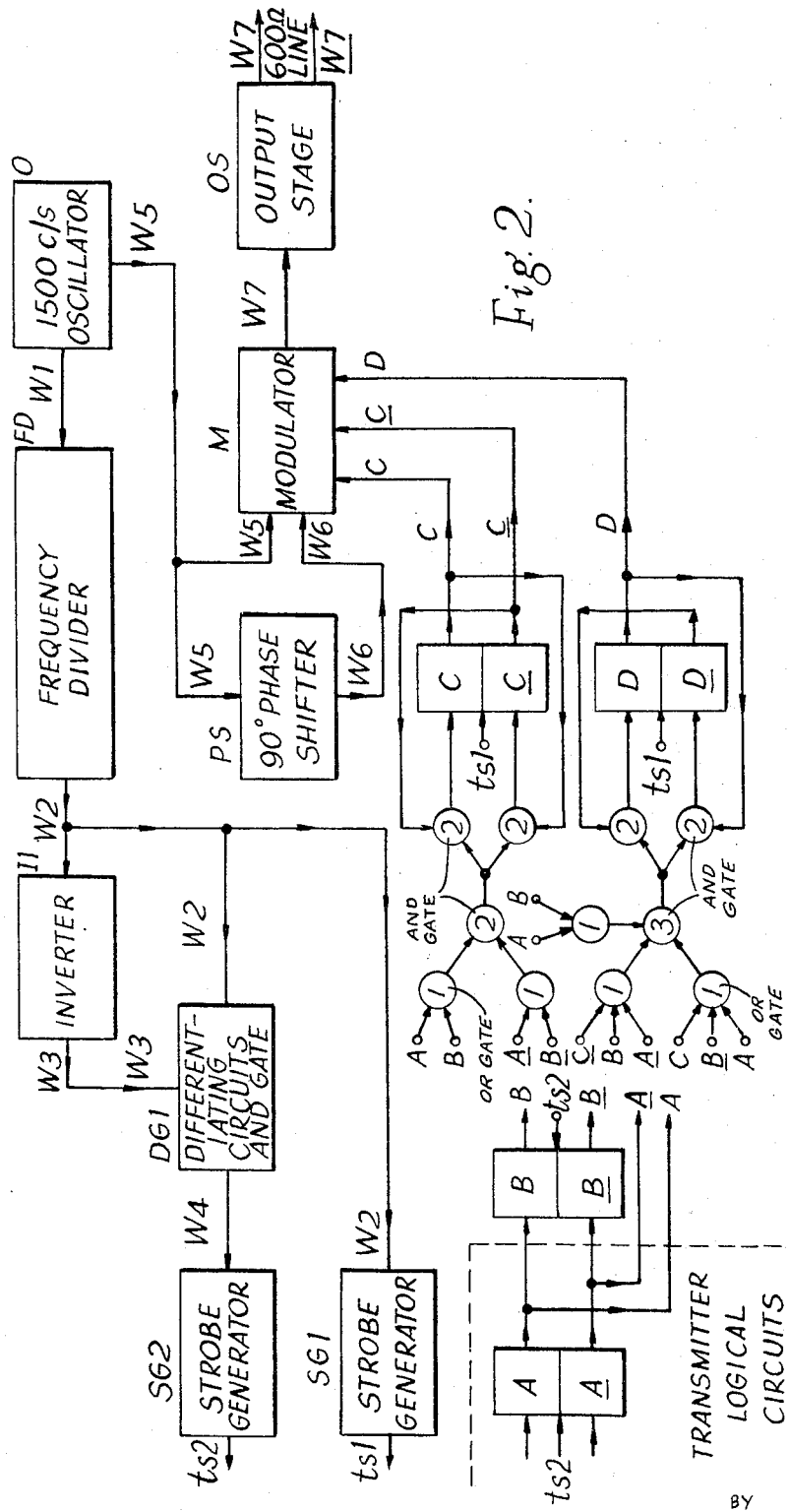
Figure 3:
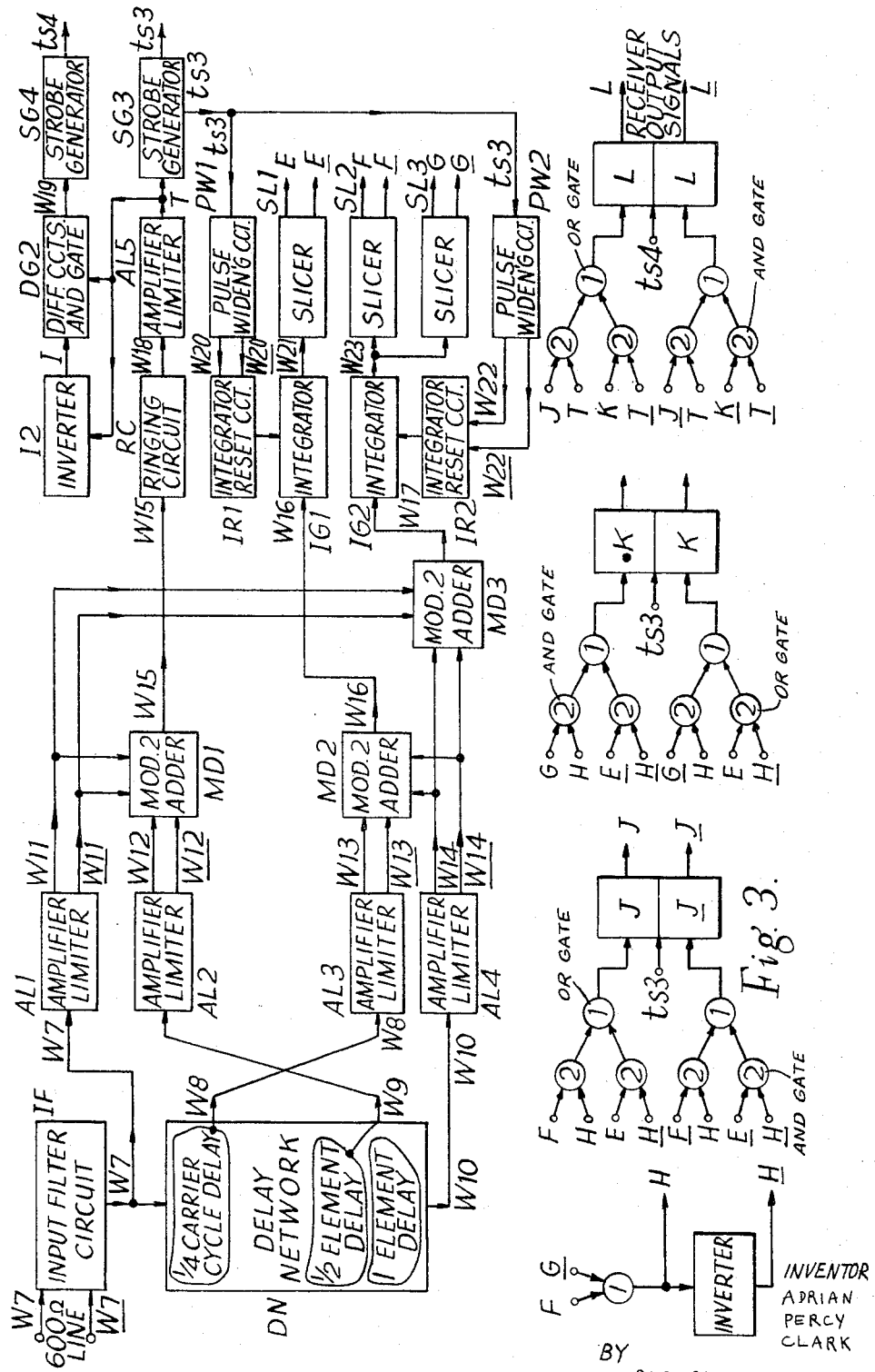
Figure 4:
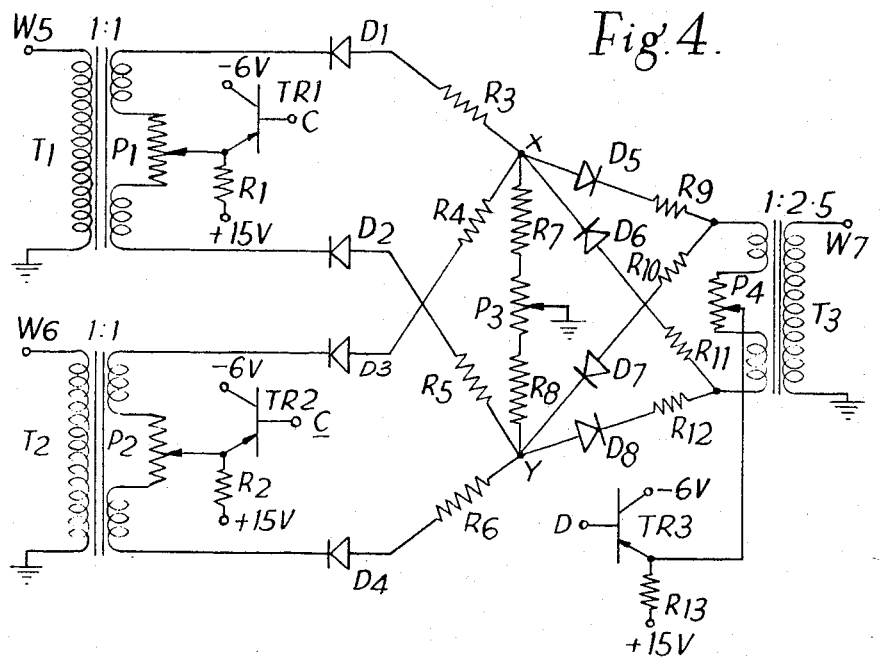
Figure 5:
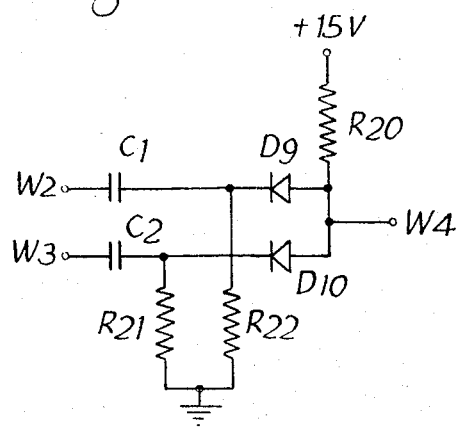
Figure 7:
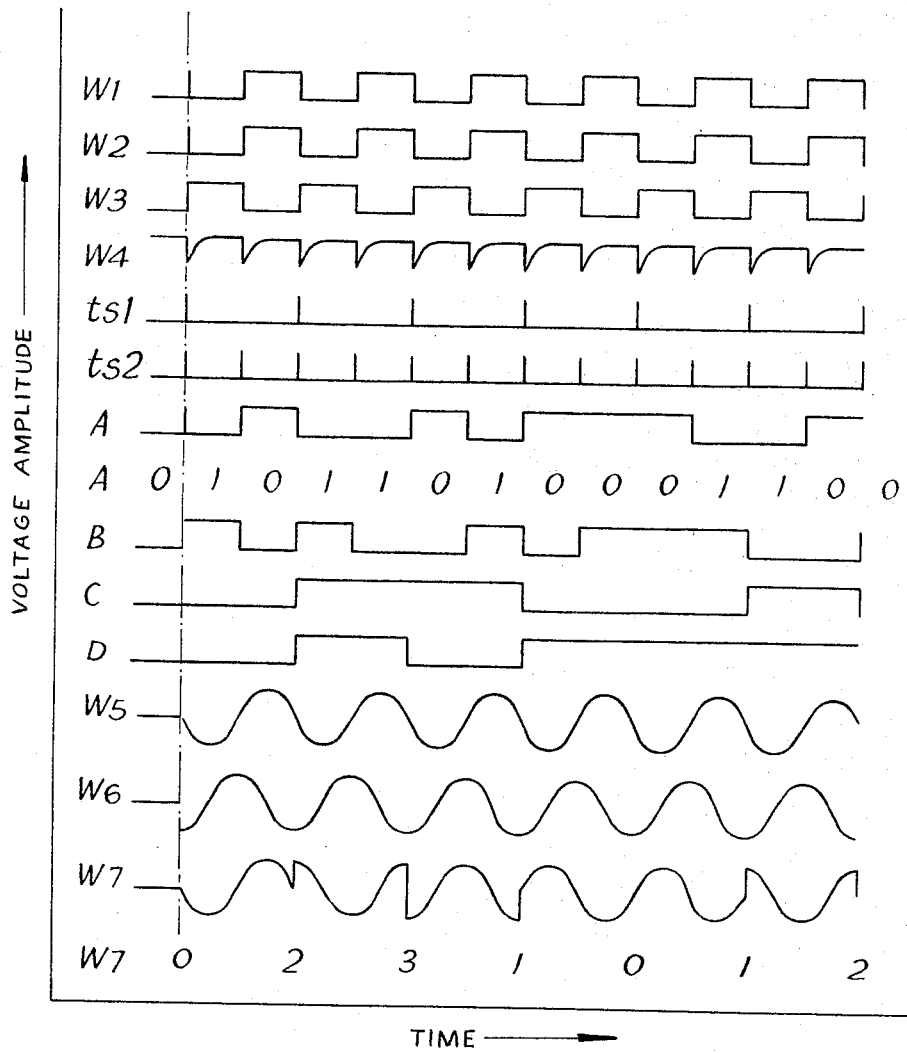
Figure 8:
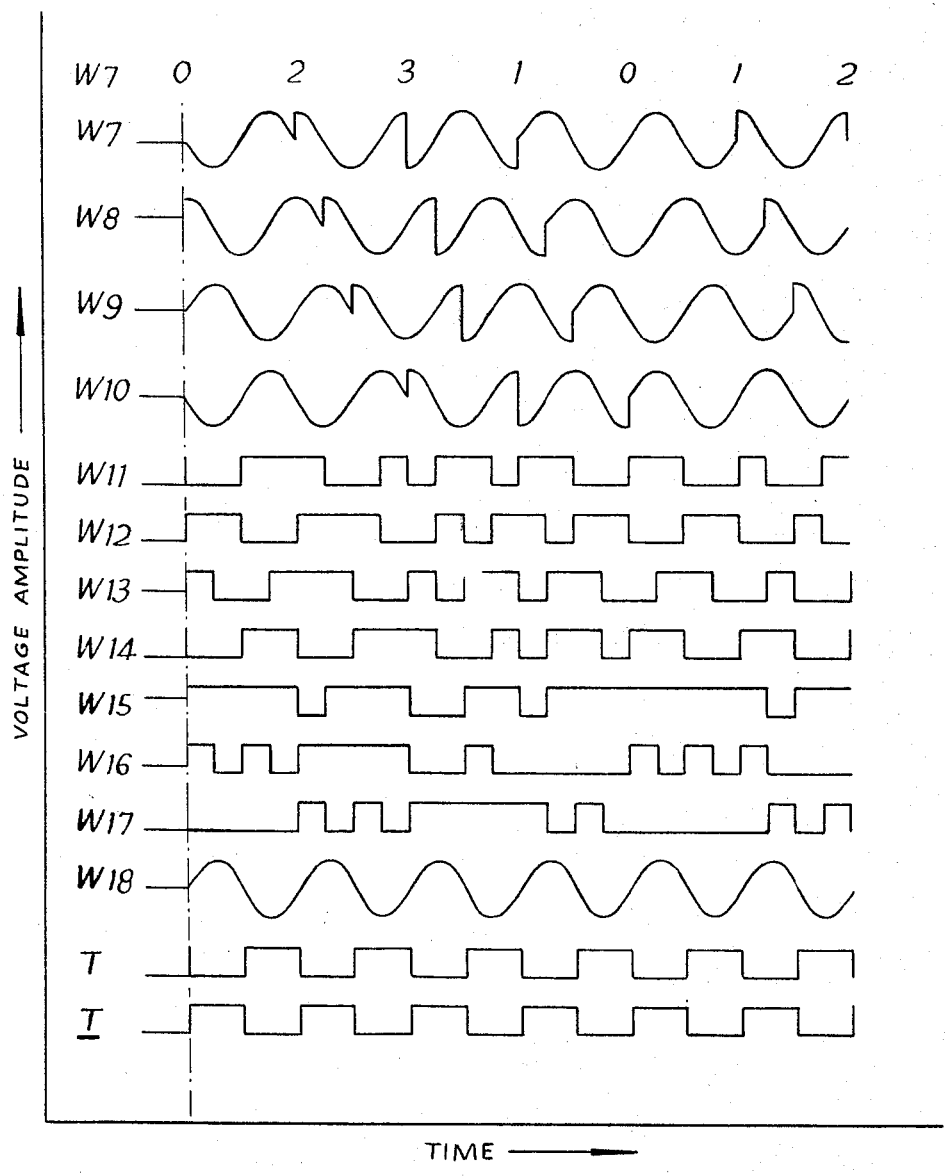

The invention will be better understood from the following description of one method of carrying it into effect which should be taken in conjunction with the accompanying drawings comprising FIGURES 1–9 which relate to a system for transmitting data in binary form. Of these, FIGURE 1 represents a block schematic of the complete system and indicates the relationship of the transmitter and receiver to the associated logical circuits. FIGURE 2 is a block schematic of the equipment at the transmitting end, showing also the logical circuits included in the transmitter and the means by which they control the modulator. FIGURE 3 is a similar block schematic for the receiving equipment again showing the logical circuits whereby the received quaternary signals are converted into binary output signals corresponding to those which control the transmission at the outgoing end. FIGURE 4 shows details of the modulator circuit for FIGURE 2 whereby the signals from the logical circuits are converted into a quaternary phase-modulated signal for transmission over the line. FIGURE 5 shows details of a differentiating circuit and gate also shown in FIGURE 2 for use in the derivation of the strobe pulses. FIGURE 6 shows details of the integrator and the integrator reset circuit which forms one feature of the invention and appears at two points in the blockd diagram of FIGURE 3. FIGURE 7 shows a number of waveforms $W_1$ through $W_7$ in connection with the equipment at the transmitting end, and FIGURES 8 and 9, which are in effect a single figure, show similar waveforms $W_7$ through I (FIG. 8) and T through L (FIG. 9) appearing at various points in the equipment at the receiving end. It may be mentioned that for convenience in the understanding of FIGURE 9 the waveforms T and $\underline{T}$ which appear at the bottom of FIGURE 8 are repeated in FIGURE 9.

The data transmission system illustrated in FIGURE 1 is assumed to be a synchronous system in which the signalling speed is determined by an oscillator in the pulse transmitter PT, from which oscillator the signal carrier itself is also derived. The pulse transmitter PT and the pulse receiver PR each generate a timing waveform, $ts2$ and $ts4$ respectively, the pulse repetition rate of each of these timing waveforms being twice the element rate of the signal transmitted to line. The information-carrying square wave signals A and $\underline{A}$ at the input to the pulse transmitter and L and $\underline{L}$ at the output of the pulse receiver, which are in each case synchronised to the corresponding timing waveform, have thus twice the element rate of the signal transmitted to line W7 and its inverse $\underline{W7}$ and are binary coded time sequential signals.

The method of operation of the data transmission system will be described with reference to the particular case where each element in the signal transmitted to line contains one complete cycle of the signal carrier, and it is assumed moreover that the system uses a 1500 c./s. signal carrier. The invention however is equally applicable to the case in which a plurality of complete cycles of the signal carrier are used for each signal element.

Referring now more particularly to FIGURES 2 and 7, the 1500 c./s. oscillator O in the transmitter provides a sine wave and a square wave output, the two being accurately in phase. The 1500 c./s. square wave output W1, in applications where two or more complete cycles of the signal carrier are used per element, is fed through a suitable frequency divider FD, whose output W2 has the corresponding fraction of the frequency of W1. In the particular case being considered the frequency divider is of course omitted, W2 being therefore identical to W1.

W2 is fed to strobe generator SG1 whose output waveform $ts1$ contains a very short positive-going pulse at each negative-going edge of the waveform W2. The waveform W2 is also fed through an inverter I1 to give the waveform W3 and the waveforms W2 and W3 are fed to the differentiating circuit and gate DG1, whose basic circuit is illustrated in FIGURE 5. The output waveform W4 from this circuit contains a negative-going pulse at each negative- or positive-going edge in the waveform W1. Since the oscillator is designed to give for W1 an accurately symmetrical square wave, the pulses in W4 will be regularly spaced. W4 is fed to the strobe generator SG2, whose output waveform ts2 contains a very short positive-going pulse at each negative-going edge of the waveform W4, and therefore also at each positive- or negative-going edge of the waveform W1.

Referring to FIGURE 5, it will be appreciated that the effect of the capacitors C1 and C2 and diodes D9 and D10 is that the negative-going edge of each of the waveforms W2 and W3 produces a sharp negative peak in the output waveform W4. The corresponding positive-going edge of the other waveform is unable to affect the output in consequence of the associated diode. The resistors R20, R21 and R22 are of such values that the change from positive to negative in the waveforms W2 and W3 is sufficient to change the state of the diodes from reverse-biased to forward-biased.

The timing waveform ts2 is fed to the toggle B in the pulse transmitter and also to the transmitter logical circuits whose function is to provide the information-carrying square wave signal A and its inverse $\underline{A}$, these being synchronised to the 3000 p./s. timing waveform ts2. A negative level in the waveform A at each occurrence of a strobe pulse in ts2 represents a 1 and a positive level represents a 0, A being a binary-coded time-sequential signal. The toggle B acts as a single-stage shift register, so that at each strobe pulse in ts2, the signal stored in toggle B is that which was stored in toggle A at the previous strobe pulse in ts2. Thus at any occurrence of a strobe pulse in the 1500 p./s. timing waveform ts1, two successive signal elements in the waveform A will be stored in the toggles B and A, and at the next occurrence of a strobe pulse in ts1 the following pair of adjacent signal elements in the waveform A will be stored in the toggles B and A, and so on.

The toggles C and D, together with their associated logical circuits, perform the operation of converting the two binary bits A and B at each occurrence of a strobe pulse in ts1 into the corresponding quaternary element or, more precisely, into the corresponding relation between two adjacent quaternary elements in the phase-modulated carrier signal transmitted to line. The sine wave output signal W5 from the 1500 c./s. oscillator O is passed through the 90° phase shifter PS in which its phase is advanced by 90° to give the sine wave W6. Both W5 and W6 are fed to the modulator M, whose circuit outline is shown in FIGURE 4. The waveforms C, $\underline{C}$ and D from the toggles C and D are also fed to the modulator, and these waveforms enable the output signal carrier to be set in any one of four different phases whose values are spaced at intervals of 90°. These waveforms are shown applied by way of buffer circuits to the appropriate points of the modulator, the buffer circuits each comprising a transistor TR1, TR2, TR3 connected as an emitter follower. The design of the modulator is a development of a conventional bridge ring modulator type of circuit. The resistors R3, R4, R5 and R6 are all equal and similarly the resistors R9, R10, R11 and R12 are all equal and R7 is equal to R8. The potentiometers P1–P4 facilitate adjustment to secure the required balance. When C is at −6 volts, the diodes D1 and D2, FIGURE 4, conduct and thereby feed the waveform W5 to the points X and Y as well as holding the D.C. potential at these points at about −3 volts. The diodes D3 and D4 are cut off at this time, since $\underline{C}$ is at 0 volts, and so prevent the waveform W6 from reaching the points X and Y. Similarly when C is at 0 volts and $\underline{C}$ at −6 volts, the waveform W6 is fed to the points X and Y, whereas the waveform W5 is disconnected from these points. Thus when C is at −6 volts the carrier phase angle at the points X and Y is 0° and when C is at 0 volts the carrier phase angle here is +90°. When D is at −6 volts, the phase of the carrier in W7 is the same as that at the points X and Y, since the diodes D5 and D8 are conducting and D6 and D7 are cut-off. On the other hand when D is at 0 volts, the phase of the carrier in W7 is the inverse of that at the points X and Y i.e. shifted by ±180° relative thereto, since D6 and D7 are then conducting and D5 and D8 cut off. Thus a suitable combination of the signals C and D will give any of the four different required carrier phases in W7, and therefore a suitable combination of changes in the signals C and D will at any time give any one of the four different required phase shifts between adjacent signal elements, that is 0°, ±90° or ±180°. The relationship between the binary code in the waveform A and the quaternary code in the waveform W7 is as follows:

| A (value) | 00 | 01 | 10 | 11 |
|---|---|---|---|---|
| W7 (value) | 0 | 1 | 2 | 3 |
| W7 (phase shift) | 0° | +90° | −90° | ±180° |

Thus, if at the occurrence of a strobe pulse in the timing waveform ts1, A is positive and B negative so that A represents a 0 and B represents a 1, corresponding to 10 in the waveform A, the phase of the carrier in W7 will be shifted by −90° corresponding to 2 in the waveform W7. In this case if C was initially negative, both C and D will change, whereas if C was initially positive, only C will change. The logical design by means of which the above code conversion is achieved is shown in FIGURE 2 and uses standard components and logical design techniques. W7 is passed through the output stage OS where it is suitably filtered and adjusted in level before being fed to line. The waveform which actually reaches the line terminals will be a somewhat rounded version of W7 which may appear rather different, but since this need in no way affect the principle or efficiency of operation of the system, the waveform fed to line and also in the input circuits of the receiver before limiting, where it may be yet further changed in appearance due to the receiver input filters, will in every case be shown as W7 in order to simplify the understanding of the mode of operation.

Figure 9:
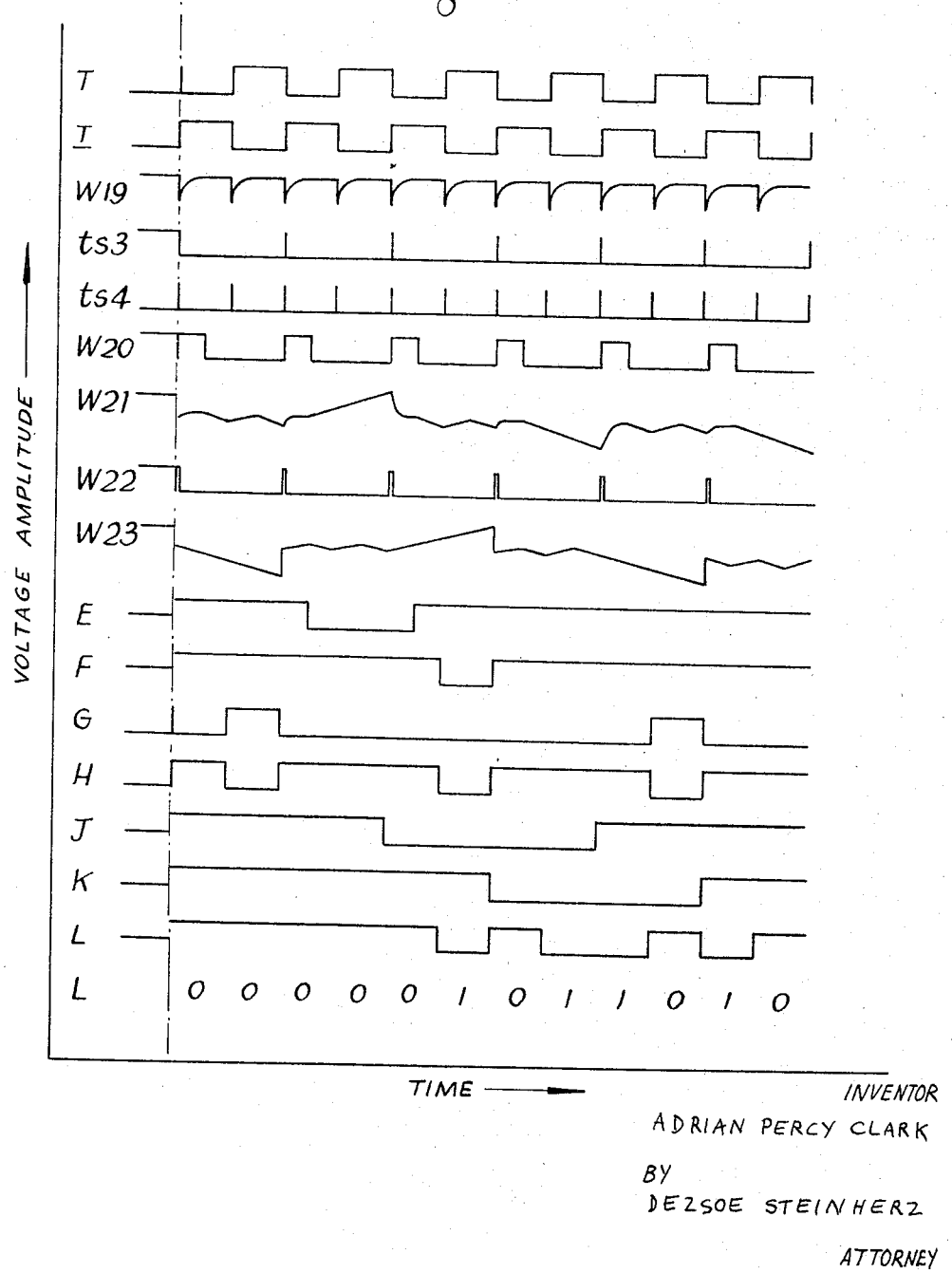

The block diagram and waveforms for the pulse receiver are shown in FIGURES 3, 8 and 9. The phase-modulated carrier signal received from line is first filtered by the input filter circuit IF and then fed through an all-pass network DN giving a delay of one signal element which is tapped at two points. The delay at the first of these points is equal to the duration of a quarter of a carrier cycle which in the case being considered is also equal to the duration of a quarter of a signal element. The delay at the second tapping point is equal to the duration of half a signal element. The delay network used is designed to introduce negligible signal distortion with very accurately controlled values of delay. The signal at the two tapped points and also at the input and output of the delay network is in each case fed to an amplifier limiter which provides an output square wave signal together with its inverse. The four amplifier-limiter circuits AL1–4 used are of known type and are identical in every respect and are designed to operate correctly for input signal levels down to −50 dbm, the output square wave signals corresponding to the amplified form of an accurately centred section of the input waveform.

The output signals from the amplifier limiter AL1 and amplifier limiter AL2 are fed to a modulus 2 added circuit MD1, the function of which is to provide a positive output signal when the input waveforms W11 and W12 are different and a negative output signal when these are the same. The output signal W15 from the modulus 2 adder circuit MD1 is fed to the ringing circuit RC which is in fact a narrow band filter circuit and extracts from this waveform the very strong frequency component which corresponds to the signal element rate in W7. The output signal W18 from RC is an amplified and inverted form of this frequency component. W18 is fed to a further amplifier limiter AL5 which is similar to the other amplifier limiters and produces at its output a square wave signal T corresponding to an inverted and greatly amplified form of an accurately centred and very narrow section of the waveform W18. The waveform T is fed to strobe generator SG3 whose output waveform $ts3$ contains a very short positive-going pulse at each negative-going edge of the waveform T. The waveform T is also fed through an inverter I2 to give the waveform $\bar{T}$ and the waveforms T and $\bar{T}$ are fed to the differentiating circuits and gate DG2 whose basic circuit is shown in FIG. 5. In this case the waveforms T and $\bar{T}$ correspond to waveforms W2 and W3 and an output W19 is obtained instead of W4. The output waveform W19 from this circuit contains a negative-going pulse at each negative- or positive-going edge of the waveform T. Since the amplifier limiter AL5 is designed to slice the since wave W18 along an accurately centred section of this waveform even for very low levels of W18, the waveform T will always be accurately symmetrical and thus the pulses in W19 will always be regularly spaced. W19 is fed to strobe generator SG4 whose output waveform $ts4$ contains a very short positive-going pulse at each negative-going edge of W19 and therefore also at each positive- or negative-going edge of the waveform T.

The advantages of the particular method used for extracting the required timing information from the received signal are as follows. The ringing circuit receives a pulse for each quaternary element received whose value is 1, 2 or 3, and only fails to receive a pulse for the quaternary elements which are 0. Thus the most efficient possible use is made of the received information in extracting the signal element rate, and the only restriction which need be placed on the signal code on this account is a limit on the maximum number of consecutive 0's at any one time. As this limit could normally be made quite large, the required condition would be satisfied automatically in most practical applications. Secondly since the timing waveform is not extracted from the detected signal but is obtained from the received signal quite independently, detection may be achieved by a process of pure integration, the integrated waveforms being sampled at the end of the period allocated to any one element by the timing waveform, and thus the optimum detection efficiency may be obtained giving the maximum possible tolerance to both noise and distortion. Thirdly, although the timing waveform is extracted from the received signal quite independently of the detected waveforms, because it is derived by essentially similar methods, any phase shift introduced into the detected signal by distortion effects will produce a similar phase shift in the timing waveform, and thus this important advantage which is obtained by extracting the timing waveform from the detected signal is not lost. Fourthly, since the frequency component corresponding to the received element rate in the waveform W15 is normally in the correct phase, no phase shift need be applied to W18 in order to phase correctly the waveforms $ts3$ and $ts4$. This helps to reduce the equipment cost.

The only disadvantage of this method of deriving the timing waveforms from the received signal, which is also common to the majority of the other possible methods (due in fact to a fundamental uncertainty as to the location of the signal element boundaries for certain code patterns in the transmitted signal W7), is that with the particular carrier phase shown in W7 and for codes such as 121212 . . ., 10201020 . . ., 120120 . . ., 12101210 . . ., etc., which contain no element values of 3 and extend for a sufficiently long period of say more than 50 elements, or longer if a higher Q ringing circuit is used, the phase of the frequency component W18 may be shifted by as much as 45° in extreme cases. However, it also happens that for all the signal elements causing this shift in the phase of W18, optimum detection will be obtained for any phase value of W18 between 0 and 45°, and only about half of the occasional elements tending to cause a phase shift of 45° in the opposite direction or tending to give 0° phase shift, will no longer experience optimum detection. The effect of this situation would be a reduction in tolerance to noise and distortion, in other words non-optimum detection. If however the phase of the carrier in W7 is shifted by 45° relative to the signal element boundaries, no phase shift of any kind would be experienced by the timing waveforms and therefore optimum detection efficiency would be obtained for any signal code pattern. Thus it is only when a combination of two factors, each having the most unfavourable value, takes place, that a phase shift approaching 45° could be experienced in W18, and for the large majority of the signal elements, this would not in fact affect the efficiency of detection. Furthermore the quaternary code elements of value 3 will under no circumstances introduce a phase error into the waveform W18, and the square wave pulses produced in the waveform W15 by these code elements have twice the width and therefore twice the useful energy at the signal element rate than the square wave pulses produced by either of the code elements 1 or 2. Again, on the average, half of the code elements 1 or 2 will tend to shift the phase of W18 by 45° in one direction (for the carrier phase shown for W7) and the other half will tend to shift the phase 45° in the other direction. Thus even for the most unfavourable phase of the signal carrier (as shown for W7) as long as there is a reasonable degree of randomness in the transmitted code, such as can easily be arranged when redundant information is transmitted along with the useful information for error detection and correction purposes, the maximum phase error in the timing waveforms can be kept to a sufficiently low value to be quite negligible in its effect on the tolerance to noise and distortion. In other words, if the optimum detection efficiency is required under all conditions, a restriction must be placed on the type of code patterns which may be transmitted over long periods, in order to ensure a reasonably even distribution of the two different types of each of the code elements 1 and 2. As has been mentioned above, this will normally be achieved in cases where a reasonable degree of redundant information is transmitted. Where two or more cycles of the signal carrier are used per signal element, the maximum phase shift in W18 becomes sufficiently small that no special restrictions need be placed on the code patterns used, except for the maximum limit on the number of consecutive 0's at any one time.

An alternative approach to this problem is to gate out the square wave pulses in the waveform W15 which corresponds to code elements 1 or 2 in W7, and since these are the narrower pulses, this can be done by means of a single timing circuit which would automatically gate out any negative-going pulse in W15 whose duration was less than say ⅜ of a signal element in W7, thus leaving only the broader pulses of duration of half a signal element in W7, which corresponds to the code element 3 and which always contain a frequency component of the received signal element rate in the correct phase. In this way no phase error at all could be introduced into W18 by the code elements 1 and 2. However there would now be a danger of excessively long periods with no pulses being fed to the ringing circuit, since none of the code elements 0, 1 and 2 would now feed energy to the ringing circuit. To prevent faulty operation due to this, arrangements would have to be made in the signal code to ensure that at regular intervals, say at least once in every twenty elements, there was one code element of value 3. This can be done by arranging that at least once in every say forty bits in waveform A, there were three adjacent 1's. These three adjacent 1's would have to be added to the transmitted information, they could not be used for error detection or correction purposes and they would reduce the effective rate of transmission by a factor of between 5 and 10 percent. In addition to the extra circuitry needed to insert these additional bits, further circuitry must be added in the pulse receiver, as mentioned above, in order to gate out the negative-going pulses in W15 corresponding to the code elements 1 and 2 in W7. On account of these various disadvantages, this alternative approach would only be used in cases where it was required to be able to transmit any long regular code pattern, some of which would of course in some cases cause a phase error in the timing waveforms. Clearly where two or more carrier cycles are used per signal element in W7, there would be no purpose served in using this alternative arrangement in any case, since the maximum phase error in W18 would be small enough not to degrade unduly the tolerance to noise and distortion.

The output signals from the amplifier limiters AL3 and AL4 are fed to a modulus 2 adder circuit MD2, the function of which is to provide a positive output signal when the input waveforms W13 and W14 are different and a negative output signal when these are the same. The output signal W16 from this circuit MD2 is fed to an integrator IG1 whose basic circuit is shown in FIGURE 6. The integrator circuit itself comprises the diode bridge circuit R1, R2, D1, D2, D3, D4, together with the capacitor C1. The associated integrator reset circuit IR1 comprises the diodes D5 and D6 together with the circuit containing R3, D7, D8, R4 and P1. The function of the integrator reset circuit is to force the potential across C1 to a value exactly half way between the positive and negative levels of W16, immediately preceding each integrating action which then determines whether W16 was on the average more positive or more negative over the period being considered. W16 remains positive when the two adjacent signal elements being compared as the waveforms W13 and W14 represent the quaternary code element 2, i.e. a carrier phase shift of −90° in W7, and W16 remains negative when the two adjacent signal elements being compared as the waveforms W13 and W14 represent the quaternary code element 1, i.e. a carrier phase shift of +90°. When the two adjacent signal elements being compared represent the quaternary code elements 0 or 3 in W7 corresponding to a carrier phase shift of 0° or ±180° respectively, the waveform W16 goes positive and negative alternately.

In each comparison of two adjacent signal elements in the waveforms W13 and W14, the first portion, which corresponds in duration to one quarter of the signal carrier cycle, is concerned in the comparison between the first and last portions of the earlier of the two adjacent signal elements being compared. W16 will be positive or negative over this portion depending only on the phase of the signal carrier relative to the signal element boundaries and since this is in no way related to the relative phases of the two adjacent signal elements being compared, this portion of W16 must be ignored. In order to achieve this, the output of integrator IG1 is reset during this portion of each signal element so that immediately after the end of this portion, the output of IG1 is exactly at the midpoint and not biased either positive or negative. In a system where there is one cycle of the signal carrier per signal element, this portion occupies the first quarter of the signal element duration in the comparison of each adjacent pair of elements. Thus in the particular application being considered, the waveform W20 which causes the circuit IR1 to operate when it is positive has the particular shape shown such that it resets the integrator IG1 during the first quarter of the signal element duration in the comparison of each adjacent pair of elements. The pulse widening circuit PW1 which generates W20 and its inverse $\overline{W20}$ is a conventional monostable trigger circuit or single-shot multivibrator with a time constant equal to one quarter of an element and is itself triggered by the timing waveform $ts3$, thus correctly phasing the waveform W20.

Integrator IG1 operates in the following manner. As soon as the waveform W20 goes negative having reset the integrator output, the voltage at the point Z will be −3 volts, this being half way between 0 volts and −6 volts which are the positive and negative levels of W16. For the next three-quarters of the signal element duration, W20 will be negative (at −6 volts) and $\overline{W20}$ will be positive (at 0 volts) and thus each of the diodes D5, D6, D7 and D8 will be reverse-biased and the integrator reset circuit IR1 may therefore be considered as being in effect completely disconnected from integrator IG1. During this period, while W16 is negative, the diodes D1 and D4 will be reverse-biased and the diodes D2 and D3 forward-biased. W16 is thus holding the upper end of R2 at nearly −6 volts, while R1 is connected through D3 to C1, causing C1 to be charged with the whole of the current flowing through R1. The voltage of the point Z will thus steadily decrease (or go more negative) at a rate determined by R1, C1 and the voltage difference between Z and the −15 volt supply. Since the voltage at the point Z cannot go more negative than −6 volts as both W16 and W20 will be at −6 volts, and since it was initially at −3 volts, the voltage across R1 will decrease at the most from 12 to 9 volts and so the rate of change of voltage at the point Z cannot vary by more than 25% and this is therefore a reasonably close approximation to a linear integrator. If W16 had instead gone positive, the diodes D2 and D3 would have been reverse-biased and the diodes D1 and D4 forward-biased. W16 is now holding the lower end of R1 at nearly 0 volts, while R2 is connected through D4 to C1, causing C1 to be charged with the whole of the current flowing through R2. The voltage at the point Z will thus steadily increase (or go more positive) at a rate determined by R2, C1 and the voltage difference between Z and the +15 volt supply. When Z is at −3 volts the voltage across R2 is nearly 18 volts and since $R2=1.5R1$ the same current flows through R2 as flows through R1 when Z is at −3 volts. Thus the voltage at the point Z will go positive at essentially the same rate as that at which it goes negative in the previous case, and the maximum variation in the positive rate is 17%, since the voltage at the point Z cannot go more positive than 0 volts (W16=$\overline{W20}$=0 volts at this time). Therefore for both positive and negative values of W16, the integrator IG1 is an adequate approximation to a linear integrator and consequently the value of the voltage at the point Z at the end of any period of integration (just previous to resetting) is approximately directly proportional to the proportion of this period over which W16 was positive or negative. If over the period, W16 was positive for the same length of time as it was negative, the voltage at the point Z will be −3 volts at the end of the period. If W16 was positive for more of the period than it was negative, Z will be positive relative to −3 volts at the end of the period, and if W16 was negative for more of the period than it was positive, Z will be negative relative to −3 volts at the end. The greater the magnitude of the + and − supplies feeding R1 and R2, the more accurately linear will this circuit become, although for practical purpuoses the arrangement suggested is quite adequate.

The great advantage of this arrangement over the conventional integrator circuit, comprising a resistor which couples the input signal to the unearthed end of a capacitor, is that in the latter case the rate of change of voltage across the capacitor is either very small or else far from linear and varying exponentially with the voltage across the capacitor, and thus in many cases the voltage across the capacitor is appreciably different from that which would correspond to a true average over the specified integration period. In other words, the integrating circuit used here gives a value at the end of each integration corresponding very much more closely to the true average than that which would be obtained with the simple conventional integrating circuit where the latter is designed to give in practice an adequate voltage signal for the accurate and drift-free operation of the following circuits. Consequently the detection efficiency obtainable with the new circuit is appreciably better than that obtainable with the conventional one.

The charge rate of integrator IG1, that is the rate at which the voltage at point Z goes positive or negative when W20 is negative and W16 is positive or negative respectively, is adjusted so that during the three-quarters of a signal element duration during which integration is taking place, the voltage at the point Z can never quite cause any of the reverse-biased diodes to become forward-biased, which would have the effect of clamping the voltage at Z. In this way, correct integrating action is ensured under all conditions, together with the maximum voltage change at Z.

When W20 goes positive causing integrator IG1 to be reset, the diodes D5, D6, D7 and D8 become forward-biased and the diodes D1, D2, D3 and D4 reverse-biased. C1 is now effectively disconnected from integrator IG1 and instead connected to a very low impedance point at the junction of D7 and D8, the steady potential at this point being exactly −3 volts. The impedance at this point is made sufficiently low so that the potential at Z is pulled very close to −3 volts from an initial voltage anywhere between 0 and −6 volts, before the waveform W20 goes negative again for the start of the next integrating period. The values of the resistors in the reset circuit are such that R3 is greater than R4 but less than R4+P1 so that P1 provides an adequate degree of adjustment for securing that the reset potential at Z is exactly −3 volts.

The output waveform W21 from integrator IG1 is fed to the slicer SL1 which is set so that it slices the waveform W21 at exactly −3 volts and then both amplifies and inverts the sliced section of W21 to give the waveform E. Thus when the waveform W21 is negative relative to −3 volts, E is always positive and when W21 is positive relative to −3 volts, E is always negative. The waveform $\bar{E}$ which is the inverse of E is also obtained at the output of SL1. The waveforms E and $\bar{E}$ as well as F, $\bar{F}$, G and $\bar{G}$ are fed via various gates to the toggles J and K where they are effectively sampled by the strobe pulses in the waveform $ts3$. Since these strobe pulses initiate the operation of the pulse widening circuits which operate the integrator reset circuits, the sliced waveforms E and $\bar{E}$ as well as F, $\bar{F}$, G and $\bar{G}$ are in every case sampled just before the integrator outputs are reset. When the waveform E is negative at the occurrence of a strobe pulse in $ts3$, this can correspond to any of the four different code elements in W7 except the value 1, and when E is positive at the occurence of a strobe pulse in $ts3$, this can correspond to any of the four different code elements in W7 except the value 2.

The output signals from the amplifier limiters AL1 and AL4 are fed to modulus 2 adder circuit MD3 which provides a positive output signal when the input waveforms W11 and W14 are different and a negative output signal when these are the same. The output waveform W17 from this circuit MD3 is fed to the integrator IG2 whose basic circuit is similar to that for IG1 as shown in FIGURE 6, W16, W20, $\overline{W20}$ and W21 being replaced respectively by W17, W22, $\overline{W22}$ and W23. W17 remains positive when the two adjacent signal elements being compared as the waveforms W11 and W14 represent the quaternary code element 3, i.e. a carrier phase shift of ±180° in W7, and W17 remains negative when the two adjacent signal elements being compared as the waveforms W11 and W14 represent the quaternary code element 0, i.e. a carrier phase shift of 0° in W7. When the two adjacent signal elements represent the quaternary code elements 1 and 2 in W7, corresponding to a carrier phase shift of ±90°, the waveform W17 goes positive and negative alternately. Between any two successive strobe pulses in $ts3$ the waveform W17 will, in the absence of signal distortion, either remain steadily positive (for a 3) or steadily negative (for a 0) or spend exactly the same time positive and negative (for a 1 or a 2). Integrator IG2 is therefore reset to −3 volts by its integrator reset circuit IR2 for a short period immediately following each strobe pulse in $ts3$.

The period during which it is reset is determined by the positive pulses in W22 which are generated in the associated pulse widening circuit PW2. This is a conventional monostable trigger circuit or single-shot multivibrator and is itself triggered by the timing waveform $ts3$, thus correctly phasing the waveforms W22 and its inverse $\overline{W22}$ at the output of this pulse widening circuit. The width of the positive pulses in W22 is kept as narrow as possible, the limit of the smallest practical width being set by the shortest achievable time constant in the corresponding integrator reset circuit. Thus for this integrator reset circuit the resistance values of R3, R4 and P1 in FIGURE 6 are reduced to the minimum and it may be desirable to provide a slightly longer charge time by increasing the value of R1 and R2. The duration of the positive pulses in W22 is kept only just long enough to allow the potential at Z to be pulled sufficiently close to −3 volts from an initial voltage anywhere between 0 and −6 volts, before the waveform W22 goes negative again for the start of the next integrating period. The charge rate of integrator IG2, that is the rate at which the voltage at point Z goes positive or negative when W22 is negative and W17 is positive or negative respectively, is adjusted so that during essentially the whole of the signal element duration between two adjacent strobe pulses in $ts3$, the voltage at the point Z can never quite cause any of the reverse-biased diodes in the circuit to become forward-biased, which would have the effect of clamping the voltage at Z. In this way, correct integrating action is ensured under all conditions. Thus under conditions of no signal distortion, the potential at the point Z will always be either fully positive relative to −3 volts or fully negative relative to −3 volts or at exactly −3 volts, at the occurrence of any strobe pulses in $ts3$. When the point Z is positive relative to −3 volts, this corresponds to a quaternary code element 3 in W7, when the point Z is negative relative to −3 volts, this corresponds to a quaternary code element 0 in W7, and when the point Z is at exactly −3 volts, this corresponds to one or other of the code elements 1 and 2 in W7. The above conditions apply at the occurrence of strobe pulses in $ts3$. There is therefore enough information in the waveform W23 to discriminate between a quaternary code element 0, 3 and either 1 or 2 in W7 but not to discriminate between 1 and 2 which is in fact achieved in the integrator IG1.

The waveform W23 is fed to both slicer SL2 and slicer SL3. Slicer SL2 is set so that it slices the waveform W23 at exactly halfway between −3 volts and the most positive limit reached by the waveform W23, this being typically −0.5 volt and giving a halfway point of −1.75 volts. Slicer SL2 both amplifies and inverts the sliced section of W23 to give the waveform F and its inverse $\bar{F}$. Thus when the waveform W23 is negative relative to −1.75 volts, F is always positive, and when W23 is positive relative to −1.75 volts, F is always negative. Slicer SL3 is set so that it slices the waveform W23 at exactly half way between −3 volts and the most negative limit reached by the waveform W23, this being typically −5.5 volts and giving a half way point of −4.25 volts. Slicer SL3 both amplifies and inverts the sliced section of W23 to give the waveform G and its inverse $\bar{G}$. Thus when the waveform W23 is negative relative to −4.25 volts, G is always positive, and when W23 is positive relative to −4.25 volts, G is always negative. When at a strobe pulse in $ts3$, both F and G are negative, this corresponds to a quaternary code element of 3 in W7 and when both F and G are positive this corresponds to a quaternary code element of 0. When at a stroke pulse in $ts3$ F is positive and G negative, this corresponds to a quaternary code element of either 1 or 2 in W7. A quaternary code element of 1 in W7 will give a positive level in the waveform E at a strobe pulse in $ts3$ and a quaternary code element of 2 in W7 will give a negative level in the waveform E. Thus, the waveforms E, F and G contain enough information to identify all the four different quaternary code elements in W7.

The toggles J, K and L, together with their associated logical circuits, perform the operation of converting the information in the waveforms E, F and G into the binary coded sequential signal L and its inverse $\bar{L}$ at the output of the pulse receiver, the signal L being identical to the signal A fed to the pulse transmitter at the other end of the line but delayed relative to it by several bits. The square wave signals L and $\bar{L}$ are synchronised to the 3000 p./s. timing waveform $ts4$.

The waveform H is obtained by passing F and $\bar{G}$ through an OR gate, such that H is positive except when either F is negative or G is positive. Thus when at a strobe pulse in $ts3$, H is negative, i.e. the output $\bar{H}$ is available since negative logic is assumed, it indicates that the corresponding quaternary code element is either 0 or 3 and therefore that the correct information regarding this element can be found in the waveforms F and G. When at a strobe pulse in $ts3$, H is positive, i.e. the output is H, it indicates that the corresponding quaternary code element is either 1 or 2 and therefore that the correct information regarding this element can be found in the waveform E.

The operation of the logical circuits associated with the toggles J and K is thus as follows. When H is negative, it connects the waveforms F and $\bar{F}$ to the J and $\bar{J}$ inputs respectively of the toggle J. When H is positive, it connects the waveforms E and $\bar{E}$ to the J and $\bar{J}$ inputs respectively of the toggle J. When H is negative, it also connects the waveforms G and $\bar{G}$ to the K and $\bar{K}$ inputs respectively of the toggle K, whereas when H is positive, it connects the waveforms $\bar{E}$ and E to the K and $\bar{K}$ inputs respectively of the toggle K. At each strobe pulse in $ts3$ the output waveforms of these two toggle change (if necessary) to the corresponding input signals.

The toggle L, together with its associated logical circuits, performs the operation of converting the information which is stored in the toggles J and K in the form of two parallel binary coded signals, into the corresponding serial or sequential binary coded signal L, whose bit rate is therefore twice that of either J or K. By using the waveforms T and $\underline{T}$ whose fundamental frequency is 1500 c./s., during each element in the waveforms J and K, the toggle L at the two successive strobe pulses in the timing waveform $ts4$, takes up first the values of J and $\underline{J}$ for the output waveforms L and $\underline{L}$ respectively and then the values of K and $\underline{K}$ for the output waveforms L and $\underline{L}$ respectively. Thus the quaternary code element 0 in W7 will appear as the values 0 and 0 in the corresponding elements of J and K respectively, 1 in W7 will appear as 0 and 1 in J and K respectively, 2 in W7 will appear as 1 and 0 and 3 as 1 and 1 in J and K respectively. These will be converted at the toggle L as follows: 0 and 0 in the corresponding elements of J and K respectively into 00, 0 and 1 in J and K respectively into 01, 1 and 0 into 10 and 1 and 1 in J and K respectively into 11, in the output waveform L. Thus the pulse receiver output waveform L will be identical with the input waveform A fed to the pulse transmitter at the other end of the line, but delayed relative to it by several bits. L is also synchronised to $ts4$, the receiver output timing waveform.

As mentioned above, the pulse widening circuits comprise a conventional monostable trigger circuit or single-shot multivibrator which is triggered from the timing waveform $ts3$. The output is in each case fed through a buffer stage giving the output waveform and its inverse and capable of feeding the heavy current required into the integrator reset circuit.

I claim:

1. In an electrical signalling system for the transmission of a series of binary information elements by quaternary phase modulation, a first toggle, means for supplying the binary information to effect the selective operation of said first toggle, a second toggle, means for operating said second toggle from said first toggle so as to constitute a single-stage shift register, a third toggle, a fourth toggle, means for operating said third and fourth toggles under the joint control of said first and second toggles, a source of carrier current of predetermined frequency, a phase modulator, means for supplying carrier current from said source to said modulator, a 90° phase shifter, means for supplying carrier current from said source to said modulator by way of said phase shifter, and means for controlling said modulator jointly from said third and fourth toggles whereby the phase change in the output from said modulator between successive elements varies in accordance with the value of successive pairs of elements in said binary information.

2. In an electrical signalling system for the transmission of a series of binary information elements by quarternary phase modulation, a first toggle, means for supplying the binary information to effect the selective operation of said first toggle, a second toggle, means for operating said second toggle from said first toggle so as to constitute a single-stage shift register, a third toggle, means for operating said third toggle under the joint control of said first and second toggles, a fourth toggle, means for operating said fourth toggle under the joint control of said first, second and third toggles, a source of carrier current of predetermined frequency, a phase modulator, a 90° phase shifter, means controlled by said third toggle for supplying carrier current to said modulator either direct from said source or by way of said phase shifter, an output circuit, and means controlled by said fourth toggle for reversing the supply of carrier current to said output circuit whereby the phase change in the output circuit between successive elements varies in accordance with the value of successive pairs of elements in said binary information.

3. In a signalling system as claimed in claim 2 wherein said carrier current generator produces a sine wave, means for producing a square wave accurately in phase with said sine wave, a first strobe generator, means for supplying said square wave to said first strobe generator to produce a first strobe signal of the same frequency as said square wave, an inverter, means for supplying said square wave to said inverter, a differentiating circuit, means for supplying said square wave and the output from said inverter to said differentiating circuit to give an output wave having twice the frequency of said square wave, a second strobe generator, means for supplying said output wave to said second strobe generator to produce a second strobe signal of twice the frequency of said square wave, means for operating said first and second toggles under the control of said second strobe signal, and means for operating said third and fourth toggles under the control of said first strobe signal.

4. In an electrical signalling system for the transmission of a series of binary information elements by quaternary phase modulation, an arrangement for extracting a received element timing waveform, comprising a delay network arranged to introduce a delay of half an element, a first amplifier limiter, means for supplying the received waveform to said first amplifier limiter to produce a first output waveform having one or other of two values, a second amplifier limiter, means for supplying the received waveform to said second amplifier limiter by way of said delay network to produce a second output waveform having one or other of said two values, means for combining said first and second output waveforms to give a further waveform which has one of two values when said output waveforms have the same value and the other of said two values when said output waveforms have different values, and filter means for deriving a sine wave of the required frequency from said further waveform.

5. In an electrical signalling system for the transmission of a series of binary information elements by quaternary phase modulation, an arrangement for extracting a received element timing waveform comprising a delay network arranged to introduce a delay of half an element, a first amplifier limiter, means for supplying the received waveform to said first amplifier limiter to produce a first output waveform having one or other of two values, a second amplifier limiter, means for supplying the received waveform to said second amplifier limiter by way of said delay network to produce a second output waveform having one or other of said two values, means for combining said first and second output waveforms to give a further waveform which has one of two values when said output waveforms have the same value and the other of said two values when said output waveforms have different values, filter means for deriving a sine wave of the required frequency from said further waveform, a third amplifier limiter, means for supplying said sine wave to said third amplifier limiter to give a square wave, a first strobe generator, means for supplying said square wave to said first strobe generator to produce a first strobe signal of the same frequency as said square wave, an inverter, means for supplying said square wave to said inverter, a differentiating circuit, means for supplying said square wave and the output from said inverter to said differentiating circuit to give an output wave having twice the frequency of said square wave, a second strobe generator, and means for supplying the output from said differentiating circuit to said second strobe generator to produce a second strobe signal of twice the frequency of said square wave.

6. A modulator for producing quaternary modulation of a carrier current, comprising a first source of carrier current of predetermined frequency, a second source of carrier current of the same predetermined frequency but differing in phase by 90° from said first source, a first pair of diode rectifiers, a second pair of diode rectifiers, a pair of common terminals, means for connecting said first source to said common terminals by way of said first pair of diode rectifiers, means for connecting said second source to said common terminals by way of said second pair of diode rectifiers, means for supplying a first control potential arranged to have one or other of two values, means for causing said first control potential to bias one or other of said first and second pairs of rectifiers so that said first and second sources are effective alternatively dependent on the value of said first control potential, a pair of output terminals, means for connecting each of said common terminals to each of said output terminals, each of said connections including a rectifier, means for applying a second control potential arranged to have one or other of two values, and means for causing said second control potential to bias said rectifiers in said connections selectively whereby said output terminals provide carrier current which has been subjected to quaternary modulation effected jointly by said first and second control potentials.

7. A modulator for producing quaternary modulation of a carrier current, comprising a first source of carrier current of pedetermined frequency, a second souce of carrier current of the same predetermined frequency but differing in phase by 90° from said first source, a first transformer having a primary winding and a centre-tapped secondary winding, a first pair of diode rectifiers, a pair of common terminals, means for connecting said first source to the primary of said first transformer, means for connecting the secondary of said first transformer to said common terminals by way of said first pair of diode rectifiers, a second transformer having a primary winding and a centre-tapped secondary winding, a second pair of diode rectifiers, means for connecting said second source to the primary of said second transformer, means for connecting the secondary of said second transformer to said common terminals by way of said second pair of diode rectifiers, a resistance network connected between said common terminals, means for applying a fixed potential to a centre tapping of said resistance network, means for supplying a first control potential arranged to have one or other of two values, means for applying said first control potential to the centre tappings of the secondaries of said first and second transformers to bias one or other of said first and second pairs of rectifiers so that said first and second sources are effective alternatively dependent on the value of said first control potential, a pair of output terminals, means for connecting each of said common terminals to each of said output terminals, each of said connections including a rectifier, means for supplying a second control potential arranged to have one or other of two values, and means for causing said second control potential to bias said rectifiers in said connections selectively whereby said output terminals provide carrier current which has been subjected to quaternary modulation effected jointly by said first and second control potentials.

8. A modulator for producing quaternary modulation of a carrier current, comprising a first source of carrier current of predetermined frequency, a second source of carrier current of the same predetermined frequency but differing in phase by 90° from said first source, a first transformer having a primary winding and a centre-tapped secondary winding, a first pair of diode rectifiers, a pair of common terminals, means for connecting said first source to the primary of said first transformer, means for connecting the secondary of said first transformer to said common terminals by way of said first pair of diode rectifiers, a second transformer having a primary winding and a centre-tapped secondary winding, a second pair of diode rectifiers, means for connecting said second source to the primary of said second transformer, means for connecting the secondary of said second transformer to said common terminals by way of said second pair of diode rectifiers, a resistance network connected between said common terminals, means for applying a fixed potential to a centre tapping of said resistance network, means for supplying a first control potential arranged to have one or other of two values, means for applying said first control potential to the centre tappings of the secondaries of said first and second transformers to bias one or other of said first and second pairs of rectifiers so that said first and second sources are effective alternatively dependent on the value of said first control potential, a pair of output terminals, means for connecting each of said common terminals to each of said output terminals, each of said connections including a rectifier, means for supplying a second control potential arranged to have one or other of two values, a third transformer having a centre-tapped primary winding and a secondary winding, means for connecting the primary of said third transformer across said output terminals, and means for applying said second control potential to the centre tapping of the primary said third transformer to bias said rectifiers in said connections selectively whereby the secondary of said third transformer provides carrier current which has been subjected to quaternary modulation effected jointly by said first and second control potentials.

9. A modulator as claimed in claim 8 in which each control potential is applied by way of a buffer circuit comprising a transistor connected as an emitter follower having the said potential applied to its base and its emitter connected to the said centre tapping.

10. In an electrical signalling system for the transmission of a series of binary information elements by quaternary phase modultion, an integrating circuit for processing a waveform comprising a diode bridge, means for applying the waveform to one corner of said bridge, a capacitor having one terminal connected to the opposite corner of said bridge and the other terminal to a reference potential, a first resistor, a source of potential positive with regard to said reference potential, a connection from said positive potential source to one of the remaining alternate corners of said bridge by way of said first resistor, a second resistor, a source of potential negative with regard to said reference potential, a connection from said negative potential source to the other remaining alternate corner of said bridge by way of said second resistor, and an output lead connected to said one terminal of said capacitor.

11. An integrating circuit as claimed in claim 10 in which the values of said first and second resistors are so related that the charging current from said capacitor is substantially the same whichever resistor is effective.

12. In an electrical signalling system for the transmission of a series of binary information elements by quaternary phase modulation, an integrating circuit for processing a waveform over a predetermined period comprising a diode bridge, means for applying the waveform to one corner of said bridge, a capacitor having one terminal connected to the opposite corner of said bridge and the other terminal to a reference potential, two sources of potential positive and negative with regard to said reference potential connected respectively to the remaining alternate corners of said bridge, an output lead connected to said one terminal of said capacitor, a timing waveform having a cycle time equal to said predetermined period, a first rectifier, a second rectifier, means for connecting said timing waveform to said output lead by way of said first rectifier, means for connecting the inverse of said timing waveform to said output lead by way of said second rectifier, a third rectifier, means for connecting said timing waveform to one of said alternate corners of said bridge by way of said third rectifier, a fourth rectifier and means for connecting the inverse of said timing waveform to the other of said alternate corners of said bridge by way of said fourth rectifier.

References Cited by the Examiner

UNITED STATES PATENTS

| | | | |
|---|---|---|---|
| 2,965,823 | 12/1960 | Wolman | 333—19 X |
| 3,037,568 | 6/1962 | Hannum | 325—345 X |
| 3,128,343 | 4/1964 | Baker | 340—170 X |

DAVID G. REDINBAUGH, *Primary Examiner.*

J. T. STRATMAN, *Assistant Examiner.*